United States Patent
Cotten

(10) Patent No.: US 6,330,590 B1
(45) Date of Patent: Dec. 11, 2001

(54) PREVENTING DELIVERY OF UNWANTED BULK E-MAIL

(76) Inventor: William D. Cotten, P.O. Box 2115, Statesboro, GA (US) 30459

(*) Notice: Subject to any disclaimer, the term of this patent is extended or adjusted under 35 U.S.C. 154(b) by 0 days.

(21) Appl. No.: 09/225,310

(22) Filed: Jan. 5, 1999

(51) Int. Cl.⁷ .................................................. G06F 13/00
(52) U.S. Cl. .............................................................. 709/206
(58) Field of Search .................................. 709/201, 206, 709/204, 200

(56) References Cited

U.S. PATENT DOCUMENTS

| | | | | |
|---|---|---|---|---|
| 5,619,648 | * | 4/1997 | Canale et al. | 709/206 |
| 6,023,723 | * | 2/2000 | McCormick et al. | 709/206 |
| 6,161,130 | * | 12/2000 | Horvitz et al. | 709/206 |
| 6,167,434 | * | 12/2000 | Pang | 709/206 |
| 6,199,103 | * | 3/2001 | Sakaguchi et al. | 709/206 |

* cited by examiner

Primary Examiner—Robert B. Harrell
(74) Attorney, Agent, or Firm—Breiner & Breiner, L.L.C.

(57) ABSTRACT

Unwanted e-mail messages from bulk advertisers (SPAM) are detected and removed from a stream of e-mail, either at a central server location or an individual recipient's location. The basic on-line e-mail message, after elimination of source and addressee identification, is scanned and coded to provide a signature ID code. A set of typically three identical messages going to different e-mail addresses is detected to signify SPAM in the e-mail flow stream. Then the SPAM signature ID code is stored for use in eliminating future such messages at either a central server or one at an individual recipient's site. The signature code is typically calculated numerically, i.e. as the well known checksum in a 16-bit cyclic redundancy check routine.

31 Claims, 2 Drawing Sheets

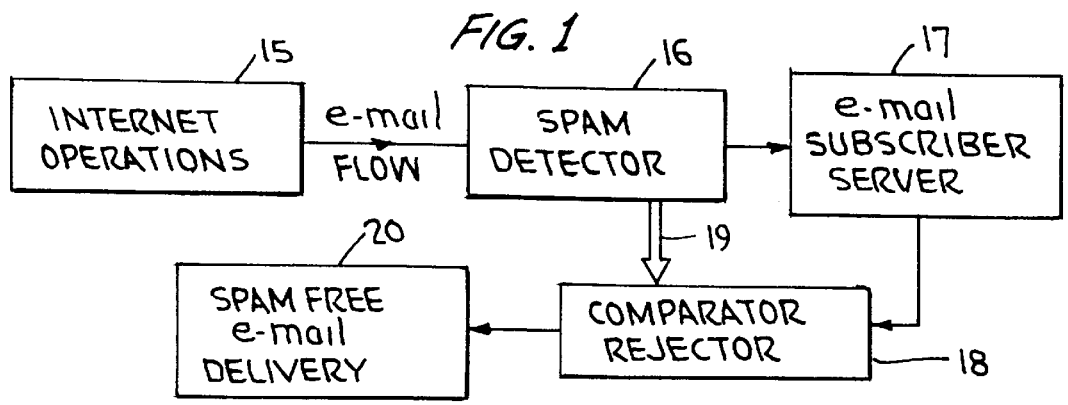
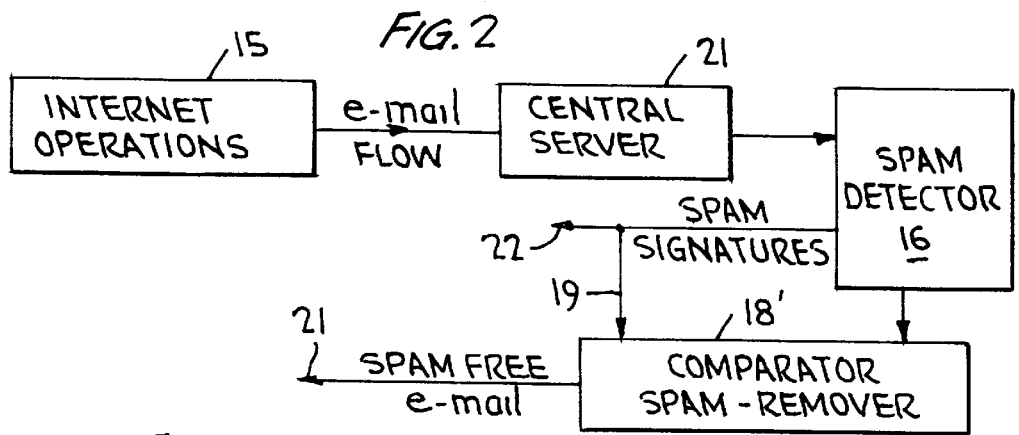
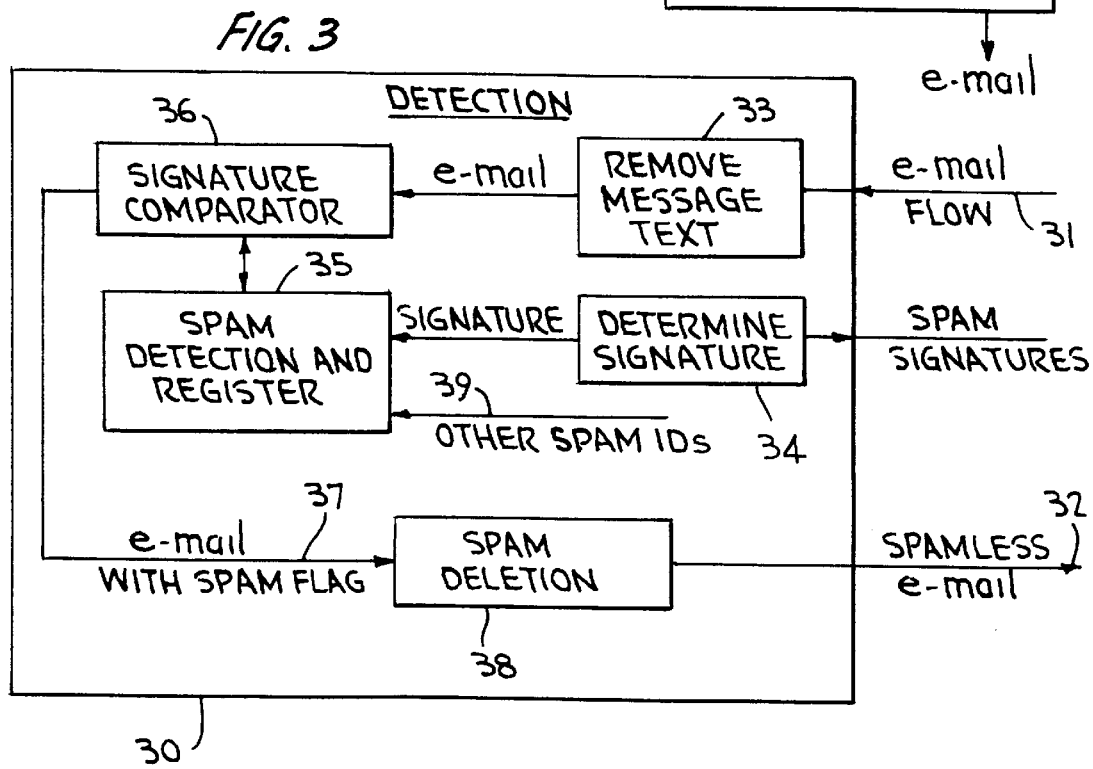

PREVENTING DELIVERY OF UNWANTED BULK E-MAIL

TECHNICAL FIELD

This invention relates to systems and methods for processing e-mail messages, and more particularly it relates to the elimination of unwanted bulk e-mail messages from delivery to specified e-mail addresses.

BACKGROUND ART

Unwanted bulk e-mail is a significant problem in the Internet community. It wastes a significant amount of time for users of e-mail systems, and it adds to Internet congestion problems by consuming large amounts of storage space and bandwidth.

Because of extremely low cost of bulk e-mail compared with other marketing strategies, such mail is not usually narrowly focussed to special audiences and results in large numbers of e-mail recipients getting messages in which they have no interest. Bulk e-mail companies thus tend to build and release mailing lists of e-mail addresses and use those lists to send messages with little discrimination or protection of the recipient's rights, desires or needs.

There have been unsatisfactory prior art attempts to eliminate unwanted bulk e-mail such as by blocking mail received from e-mail addresses known to be those of bulk marketers. However, alternative addresses may be adopted to defeat this solution. Another such attempt to block e-mail depends upon additional characters added to e-mail addresses which can be distinguished to sort out some bulk e-mail.

In short, these schemes have not been successful in the long term and in the short term are only partly successful in avoiding the bulk e-mail deliveries.

Attempts to work with filters for sorting out source addresses of bulk e-mail distributors have not proved successful, and require a heavy monitoring burden to keep bulk mailer listings up to date. Similarly those who try to sort out by key words can only in part be successful, particularly since new mailers and new messages may avoid those key words. Also this technique cannot readily be automated to omit manual appraisal and intervention.

Such suggestions as found in U.S. Pat. No. 5,619,648 put the burden upon the sender to specify more limited classes of recipients. This requires knowledge of a recipient's operations or e-mail habits and is difficult to update and monitor, even if the senders were motivated to try to reduce mailings to non-interested parties. In particular such operations add to the cost of sending effective e-mail more than the cost of random distributions to general e-mail addresses that could reach a much smaller target audience.

Accordingly this invention has as its objective the introduction of an effective way of eliminating unwanted bulk e-mail to significantly improve the internet communication process in a manner that puts little burden upon either the e-mail sender or recipient to improve the system. The "chaff" problem in cyberspace now termed a "SPAM" problem has been identified in national publications as the single largest problem confronting the Internet community.

One of the problems of prior art systems is that the cure may be worse than the disease. The intrusion of filters that must process the entire stream of e-mail is apt to cause bottlenecks that themselves reduce the communication efficiency.

This invention therefore has the further objectives of being able to process large quantities of e-mail flow without interruption, and to provide a simple foolproof process that is highly effective to eliminate the "chaff" without damaging the "wheat".

SUMMARY OF THE INVENTION

This invention seeks to identify and eliminate even first time bulk e-mailings to subscribing e-mail receiving participants. Such mailings have been unusually difficult to detect and eliminate by prior art technology.

Furthermore this invention is adapted to work at very high volume in the mainstream flow, and is simplistic in operation so that the superimposition of the filtering intelligence does little to further clog the system or result in the elimination of desired e-mail messages. It is particularly well adapted to operations with the high frequency processing equipment now employed in the industry.

The bulk e-mail is detected by monitoring live e-mail flow streams, typically at a central server location in the Internet system, but also capable of installation at separate subscriber sites. Detection is effected by reading the e-mail message, eliminating the personalization and addressing portions and processing the remaining text to establish a signature identification code. Bulk mailings are detected when there are at least two e-mail messages identified containing the same non-address contents being sent to different e-mail addresses.

After detection, a numerical signature identification code for that bulk message is established, preferably by calculating a checksum using a 16-bit cyclic redundancy check. That kind of numerical signature code is quickly and easily used to compare the many messages in the e-mail flow stream without significant impedance to the flow of data.

Typically the numerical SPAM signature codes for current bulk e-mail appearing on the network are communicated to subscribers' reception stations for deleting the bulk e-mail when the rejection apparatus is at the recipient subscriber's server.

A management coordination interface system sets up and administers the e-mail deletion process, apparatus and system. Thus a digital signature detector operating with a designated flow of e-mail sends each signature to a storage data-base comparator, which checks for uniqueness of the signature and for an initial data-base entry creates an unwanted e-mail (SPAM) signal to send to the subscribing accounts for local storage used for rejecting SPAM at authorized facilities.

Other features, advantages and objectives of this invention will be found throughout the following description, drawings and claims.

BRIEF DESCRIPTION OF THE DRAWINGS:

In the accompanying drawings, wherein like reference characters indicate similar features throughout the various views:

FIG. 1 is a block diagram of an e-mail processing embodiment of the invention for eliminating unwanted bulk mailings (SPAM) at a subscriber's station;

FIG. 2 is a block diagram of a similar e-mail processing embodiment at a central system server location;

FIG. 3 is a block diagram of a detection system for identifying and removing SPAM in an e-mail flow stream in accordance with this invention;

THE PREFERRED EMBODIMENTS

Figure 4:
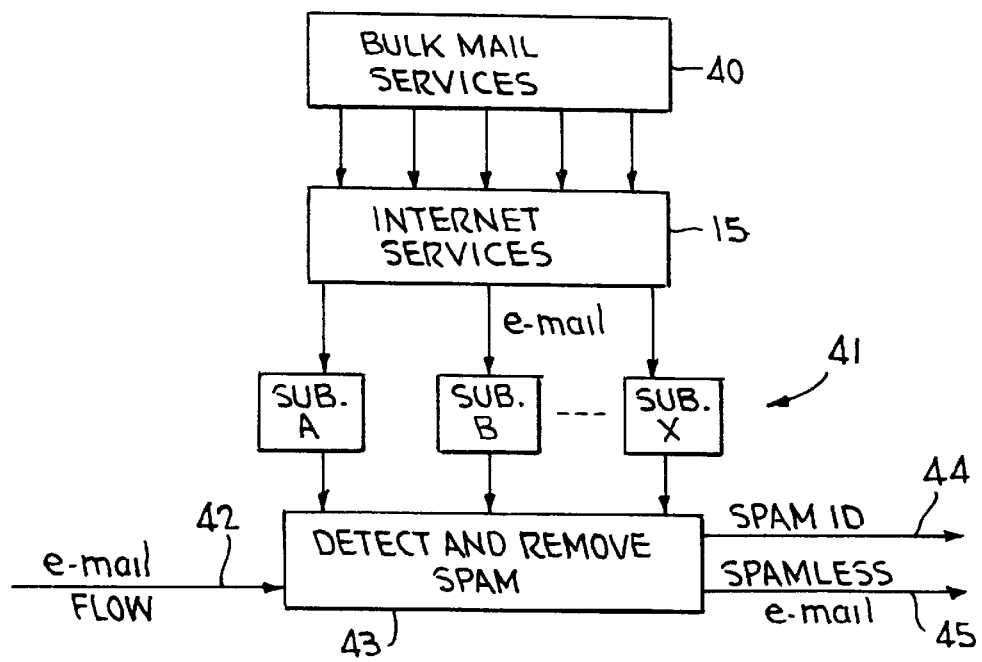
FIG. 4 is a block diagram of a monitoring system for bulk processing of e-mail to identify and remove SPAM in accordance with this invention.

Since this e-mail filter system is used to eliminate SPAM automatically, it is important to prevent any substantial interference with the normal delivery of e-mail message streams, without distortion of e-mail message content and at speeds that do not significantly delay the communication of e-mail. Also the method must be simple enough to be cost effective and reliable, with little potential for loss of wanted e-mail messages, yet able to effectively eliminate bulk mailings of a variety of formats and contents in the dynamic, technical and rapidly changing Internet Services cyberspace. The congestion of this cyberspace by consuming large quantities of bandwidth and storage facilities itself dictates the necessity for control and management of bulk mail advertising services, as well as individual subscriber aversion to "junk mail".

As may be seen from the embodiment of FIG. 1, SPAM free e-mail delivery may be achieved by simple operations achieved at a single subscriber's e-mail reception center by deleting SPAM from the e-mail stream addressed to that subscriber. As the e-mail addressed to this particular subscriber flows through the e-mail flow path from Internet Operations 15 to the e-mail subscriber server 17, SPAM is detected at the local SPAM Detector Station 16, which typically also stores the signature identification codes of currently active bulk mail messages. As indicated by the cable notation 19, the current messages passing through the Comparator Rejector Station 18 are compared with the stored SPAM signature codes and if a match is made, the SPAM is deleted, so that only SPAM-free e-mail is delivered into the subscriber's e-mail register 20.

In a similar manner shown in FIG. 2, the SPAM processing system may be located at the site of the Central Server 21, where SPAM free e-mail is made available at line 21 and sent to appropriate subscribers. This modified Comparator Spam-Remover 18' is programmed to remove the SPAM only from those subscribers requesting the service, except when it is in the interest of the Central Server 16 to reduce congestion and traffic by prohibiting the passage of all detected bulk mail which has not been licensed to use the services of that Central Server 16.

Thus, e-mail messages are processed in transit and the presence of SPAM is detected when identical messages, stripped of address and personalization data, are observed in a set of at least two, typically three, individual e-mail messages sent to different e-mail addresses. These messages are identified by a simple, easy to store, signature identification code, which is retained for further comparison, detection and processing of subsequent SPAM messages communicated in an e-mail flow path. The Central Server 16 may also via line 22 supply SPAM signatures to appropriate authorized users, typically having compatible e-mail comparator and SPAM rejection apparatus.

The Detection System 30 of FIG. 3 is inserted in an e-mail flow path 31 for removing SPAM and producing SPAMless e-mail at the modified output e-mail flow path 32. The first operational step is establishing the identify of the message text, omitting addresses and personal references, at block 33. The remaining message text portion thus serves to identify an individual message signature. This signature is then coded in abbreviated format to uniquely identify each e-mail message in transit.

A following operational step achieved in block 34 is the determination of the signature in the abbreviated coded format. Note that in the processing of e-mail streams being communicated by Internet services along any particular e-mail flow stream, the volumes may be large and the speeds of transit may be high. A practical system for inserting the detection system 30 into the flow stream therefore must be able to work very simply and very quickly with absolutely minimum delay to identify the contents of each successive e-mail message in the flow stream. Also the identity of each message must be compact so that it can be retained without extensive storage facilities or registers.

Regarding utility of the detection system 30 and the particular method of identification of individual messages, it could also be employed in the auditing or control of flow of e-mail traffic, or for other purposes than to detect SPAM. However, the detection of SPAM is a significant objective of the current invention.

It is a simple and routine matter to program into the SPAM Detection and Register 35 mechanism a SPAM detection mode that identifies bulk mailing signature codes when, typically, three e-mail messages are detected going to different e-mail addresses, and to maintain and use a register of such signature codes for eliminating SPAM. Also, a suitable arrangement is readily incorporated at the present state of the art for updating and policing the SPAM register when bulk mailing cycles are discontinued, as signified by the absence of a particular signature code for a specified period of time.

The in-line Signature Comparator 36 serves to compare the message signature of each e-mail message with the signatures in the SPAM Register 35 thereby to detect bulk mail currently being communicated. These messages may be processed either by attaching a SPAM ID flag 37, at least temporarily, to the message for later processing or to simply delete the message in the SPAM Deletion mechanism 38, thereby to produce the SPAMless e-mail flow stream 32.

Other SPAM ID signatures may be detected and entered into the SPAM Register 35 at input line 39, as obtained by special research methods or from other detection systems operable in other locations. The typical Spam Detection system of FIG. 4 may be used for assuring that known bulk mail signature ID codes are registered. Thus, for known Bulk Mail Services 40 that transmit bulk e-mail over Internet Services, a set of subscribers 41 adapted to intercept and identify bulk e-mail, may detect bulk mail messages to establish a register or to effect an on-site removal of SPAM from the e-mail flow stream 42 by way of the Detection and Removal Center 43. The output results may be made available as either SPAN ID signatures at 44 or for producing a SPAMless e-mail stream at 45.

Figure 5:
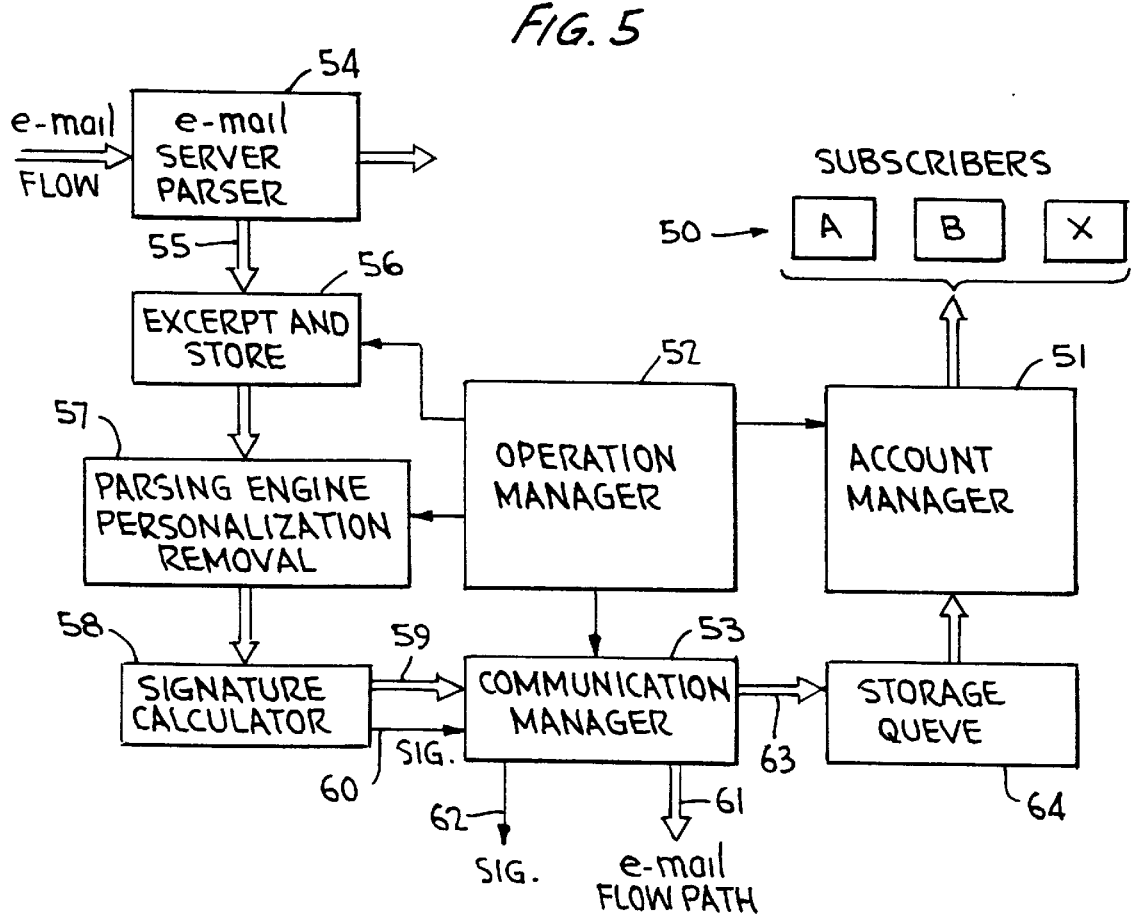
FIG. 5 is a block diagram of typical managed SPAM removal system for servicing e-mail subscribers as afforded by this invention.

FIG. 5 is a block diagram representation of a management interface used for setup and configuration of a subscriber system facility for provision of either SPAM ID signatures or SPAMless e-mail streams. This facility is typically one that is provided at a Central Server site that serves a set of subscribers 50 through an associated account manager system 51. This management interface system details only the subsidiary SPAM treatment facilities. However, note that a similar corresponding SPAM treatment management interface facility may be made available to individual subscribers. This interface system incorporates the foregoing SPAN detection and deletion technology. The Operation Manager 52 section represents the general programmed coordination procedure for implementing a basic system incorporating the novel features introduced by this invention. The Operation Manager 52 thus instructs and coordinates the other interface system activities.

This interface system uses the same parsing technology common in central servers to identify and eliminate e-mail for respective subscribers. Thus the Server Parser 54 may either directly delete bulk mail messages in the manner aforesaid, or may divert the e-mail flow through an auxiliary flow path 55 to reach those subscribers 50 that want to remove SPAM. Thus, the operation manager 52 directs the process of excerpting and storing at 56 the e-mail flow directed to subscribers 50.

Then follows the Parsing Engine 57 to edit the e-mail message text drawn from the store 56 to remove the personalization data and address information, preparing the edited text for coding in the signature calculator 58. This makes available both the original e-mail flow at 59 and the signatures of selected mail, notably SPAM ID signatures, for processing by the communication manager 53 to either send the e-mail flow onward at 61, or send the SPAM ID signatures 62 onward to authorized recipients. The SPAM-less e-mail stream then flows at 63 into the storage queue 64 for delivery to subscribers 50 at the discretion of the account manager 51.

It is therefore evident that this invention improves the state of the art by providing novel methods and apparatus for identifying and eliminating SPAM in e-mail flow paths. Those novel features illustrative of the spirit and nature of the invention are therefore defined with particularity in the following claims.

What is claimed is:

1. The method of eliminating unwanted bulk e-mail comprising in combination the steps of:
   processing e-mail messages in transit, and deriving significant identical message patterns in a set of at least two individual e-mail messages sent to different e-mail addresses to identify the presence of bulk mailings.

2. The method of claim 1 further comprising the steps of:
   establishing in said processing step an e-mail message signature identification of the messages in transit by extracting a recognizable portion of e-mail message content and calculating a numerical signature identification code for such messages.

3. The method of claim 2 further comprising the steps of:
   monitoring a stream of e-mail directed to a specified subscriber e-mail address, and eliminating e-mail messages directed to said specified e-mail address containing said numerical signature identification code identifying the presence of said bulk mailings.

4. The method of claim 2 wherein the step of processing a numerical signature identification code further comprises calculating a checksum with a 16-bit cyclic redundancy check routine.

5. The method of claim 1 comprising the further steps of establishing a set of subscriber stations, enlisting subscriber stations in said set to receive bulk e-mail messages from a plurality of known bulk mailing services, and deriving identification signatures for different bulk mailing messages received at said set of subscriber stations.

6. The method of claim 5 further comprising the step of providing the derived identification signatures to e-mail processing subscribers.

7. The method of claim 5 further comprising the steps of processing an e-mail flow stream to determine identification signatures of messages flowing in said stream, and deleting those messages from the flow stream having signatures matching those identified from said different bulk mailings.

8. The method of claim 1 comprising the further steps for managing the detection and eliminating bulk e-mail messages from an e-mail flow stream of: examining a sequence of e-mail messages derived from an e-mail flow stream, designating recognizable common portions of message patterns by a signature ID code for the messages of said sequence, detecting the presence of said signature codes for bulk mailings, and storing the signature codes of known bulk mail messages.

9. The method of claim 8 further comprising the step of deleting bulk mail identified by comparison of signatures from said sequence of e-mail messages with the stored signature codes of bulk mail messages.

10. The method of claim 8 further comprising the step of providing the signature codes for bulk mailings to e-mail recipients.

11. The method of claim 1 further comprising the step of:
    stripping from individual e-mail messages address and personalization text materials therein to identify respective stripped messages by the remaining text material content.

12. The method of claim 11 further comprising the step of providing a coded signature for each said individual message comprising a numeric count factor for the contents of stripped messages.

13. The method of claim 1 further comprising the step of processing e-mail in transit through a central server location.

14. The method of claim 1 further comprising the step of processing e-mail in transit through a server located at a subscriber station.

15. The method of claim 1 further comprising the steps of producing signature codes for identifying message contents of the e-mail messages, and inserting signature flags in processed e-mail messages identified as bulk mailings.

16. The method of claim 1 further comprising the steps of: designating identification codes for detected bulk mailing messages, and providing said identification codes to e-mail recipients.

17. Apparatus for eliminating unwanted bulk e-mail from an e-mail message flow stream, comprising in combination:
    detection means for identifying in transit bulk e-mail messages by a signature code derived from a recognizable message content portion capable of identifying bulk e-mail, and storage means for retaining bulk mail signature codes for use in identifying SPAM in e-mail messages.

18. Apparatus as defined in claim 17, further comprising:
    e-mail analysis means for establishing an e-mail signature identification code by extracting a common body of said message content from an e-mail message and calculating therefrom a signature identification code.

19. Apparatus as defined in claim 18, further comprising:
    e-mail filtering means for monitoring an e-mail stream directed to a specified e-mail address and eliminating e-mail messages directed to said specified e-mail address containing identified bulk mail.

20. The apparatus of claim 18 wherein the means for processing a numerical signature identification code further comprises means for calculating a checksum with a 16-bit cyclic redundancy check routine.

21. The apparatus of claim 18, wherein the detection means processes an e-mail flow stream at an individual recipient's e-mail reception site.

22. The apparatus of claim 18 wherein the detection means processes an e-mail flow stream at a central server location processing a set of subscribers.

23. The apparatus of claim 18 further comprising a signature code register for identified bulk mailings and comparator means for comparing signatures of signatures of e-mail messages in said flow stream with those of said register to identify bulk mailing messages.

24. The apparatus of claim 17 wherein the detection means further comprises means for stripping from the e-mail messages address and personalization text materials to identify respective stripped messages by the remaining text materials.

25. The apparatus of claim 24 further comprising recognition means for providing a coded signature for each message comprising a numeric count factor for the contents of stripped messages.

26. The apparatus of claim 17 wherein said detection means further comprises a set of e-mail reception stations, comprising on line subscribers for receiving bulk mailing messages from known bulk mail services communicated through established internet services, and e-mail message filtering means for removal of e-mail messages identified as SPAM from said e-mail flow stream.

27. Apparatus for identifying individual e-mail messages being communicated by established internets services, comprising in combination:

on stream interception means for analyzing the text of individual e-mail messages in transit, and stripping means for stripping from individual e-mail messages address and personalization text material content therein to identify respective e-mail messages from the remaining text material content.

28. Apparatus as defined in claim 27 further comprising:

means for analyzing stripped e-mail messages to provide a coded signature for individual messages comprising a numeric count factor for said remaining text material content.

29. Apparatus as defined in claim 28 wherein the means for analyzing messages further comprises checksum calculating means using a 16-bit cyclic redundancy check for determining a numeric signature code representation of the contents of individual processed e-mail messages.

30. The method of identifying individual e-mail messages being communicated by Internet Services, comprising the steps of:

stripping from individual e-mail messages address and personalization text materials therein to identify respective stripped messages by the remaining text material content.

31. The method of claim 30 further comprising the step of providing a coded signature for said individual e-mail messages comprising a numeric count factor for the contents of said stripped messages.

* * * * *